U S006676921B2

United States Patent
Park et al.

(10) Patent No.: US 6,676,921 B2
(45) Date of Patent: Jan. 13, 2004

(54) METHOD FOR PREPARATION OF LITHIUM ALUMINUM HYDRIDE FROM SODIUM ALUMINUM HYDRIDE

(75) Inventors: Won Suh Park, North Andover, MA (US); John Hiroshi Yamamoto, Haverhill, MA (US)

(73) Assignee: Rohm and Haas Company, Philadelphia, PA (US)

( * ) Notice: Subject to any disclaimer, the term of this patent is extended or adjusted under 35 U.S.C. 154(b) by 29 days.

(21) Appl. No.: 10/132,049

(22) Filed: Apr. 25, 2002

(65) Prior Publication Data

US 2003/0003045 A1 Jan. 2, 2003

Related U.S. Application Data

(60) Provisional application No. 60/290,435, filed on May 11, 2001.

(51) Int. Cl.$^7$ .................................................. C01B 6/04
(52) U.S. Cl. ........................................................ 423/646
(58) Field of Search ................................. 423/644, 646

(56) References Cited

U.S. PATENT DOCUMENTS

| | | | |
|---|---|---|---|
| 2,567,972 A | 9/1951 | Schlesinger et al. | 423/644 |
| 2,900,224 A | 8/1959 | Hinckley et al. | 423/644 |
| 2,920,935 A | 1/1960 | Finholt et al. | 423/644 |
| 3,112,989 A | 12/1963 | Banus | 423/644 |
| 3,162,508 A | 12/1964 | Bragdon et al. | 423/644 |
| 3,180,700 A | 4/1965 | Robinson | 423/644 |
| 3,207,570 A | 9/1965 | Noth | 423/644 |
| 3,337,308 A | 8/1967 | Verdieck et al. | 423/644 |
| 3,353,930 A | 11/1967 | Clasen et al. | 423/644 |
| 3,387,947 A | 6/1968 | Brendel | 423/644 |
| 4,957,726 A | 9/1990 | Marlett et al. | 423/644 |
| 5,730,952 A | 3/1998 | Rathman et al. | 423/644 |

FOREIGN PATENT DOCUMENTS

| | | | |
|---|---|---|---|
| CA | 595782 | 4/1960 | |
| EP | 1272420 | 11/1969 | |
| GB | 820513 | * 9/1959 | |
| GB | 830717 | 3/1960 | |
| GB | 905985 | 9/1962 | |
| WO | WO 98/13319 | 4/1998 | ........... C07B/31/00 |

OTHER PUBLICATIONS

Ashby, E. C. et al., Inorganic Chemistry, vol. 2, p. 499 (1963).

* cited by examiner

Primary Examiner—Stanley S. Silverman
Assistant Examiner—Maribel Medina
(74) Attorney, Agent, or Firm—Kenneth Crimaldi

(57) ABSTRACT

A method for preparing a lithium aluminum hydride solution comprising lithium aluminum hydride, toluene and tetrahydrofuran by the steps of: (a) combining lithium chloride, tetrahydrofuran, and a slurry of sodium aluminum hydride in toluene; and (b) allowing the mixture formed in step (a) to react to form a product mixture comprising lithium aluminum hydride, sodium chloride, tetrahydrofuran and toluene.

6 Claims, No Drawings

METHOD FOR PREPARATION OF LITHIUM ALUMINUM HYDRIDE FROM SODIUM ALUMINUM HYDRIDE

CROSS REFERENCE TO RELATED PATENT APPLICATIONS

This is a non-provisional application of prior pending U.S. provisional application Ser. No. 60/290,435 filed May 11, 2001.

BACKGROUND

This invention relates generally to a method for preparing lithium aluminum hydride directly from a slurry of sodium aluminum hydride in toluene.

Preparation of lithium aluminum hydride via the metathesis of sodium aluminum hydride and lithium chloride is well known. For example, U.S. Pat. No. 3,207,570 discloses a procedure for performing this reaction in tetrahydrofuran, and in mixtures of tetrahydrofuran with other ethereal solvents. In this procedure, sodium aluminum hydride is introduced as a solid or as a solution in tetrahydrofuran. However, sodium aluminum hydride typically is available commercially as a slurry in toluene. Prior to performing the metathesis reaction, the sodium aluminum hydride must be isolated from the slurry as a solid, with inevitable losses of material.

A method for converting the toluene slurry directly to a solution of lithium aluminum hydride, without prior removal of toluene and isolation of solid sodium aluminum hydride would be more efficient and would be commercially valuable.

STATEMENT OF INVENTION

The present invention is directed to a method for preparing a lithium aluminum hydride solution comprising lithium aluminum hydride, toluene and tetrahydrofuran by the steps of: (a) combining lithium chloride, tetrahydrofuran, and a slurry of sodium aluminum hydride in toluene; and (b) allowing the mixture formed in step (a) to react to form a product mixture comprising lithium aluminum hydride, sodium chloride, tetrahydrofuran and toluene.

DETAILED DESCRIPTION

Unless otherwise specified, all percentages herein are stated as weight percentages, temperatures are in ° C., and volumes in mL.

In one embodiment of the invention, a lithium aluminum hydride solution comprising lithium aluminum hydride, toluene and tetrahydrofuran is prepared by the steps of: (a) combining a solution of lithium chloride in tetrahydrofuran with a mixture comprising sodium aluminum hydride, toluene and from 25% to 98% tetrahydrofuran; and (b) allowing the mixture formed in step (a) to react to form a product mixture comprising lithium aluminum hydride, sodium chloride, tetrahydrofuran and toluene. The mixture comprising sodium aluminum hydride, toluene and from 25% to 98% tetrahydrofuran is produced by combining tetrahydrofuran with a slurry comprising sodium aluminum hydride and toluene. Preferably, the solution of lithium chloride in tetrahydrofuran is added to the mixture containing sodium aluminum hydride.

In another embodiment of the invention, a lithium aluminum hydride solution comprising lithium aluminum hydride, toluene and tetrahydrofuran is prepared by the steps of: (a) combining an amount of tetrahydrofuran with a slurry comprising sodium aluminum hydride and toluene; said amount being sufficient to form a mixture comprising sodium aluminum hydride, toluene and from 25% to 98% tetrahydrofuran; (b) combining the mixture formed in step (a) with a mixture of lithium chloride and tetrahydrofuran; and (c) allowing the mixture formed in step (b) to react to form a product mixture comprising lithium aluminum hydride, sodium chloride, tetrahydrofuran and toluene. The mixture of lithium chloride and tetrahydrofuran contains solid lithium chloride.

In the method of this invention, a slurry comprising sodium aluminum hydride ("SAH") and toluene preferably has from 1% to 75% SAH and from 25% to 99% toluene, more preferably from 10% to 60% SAH and from 40% to 90% toluene, and most preferably from 30% to 50% SAH and from 50% to 70% toluene. Tetrahydrofuran ("THF") is added to the slurry to produce a mixture comprising SAH, toluene and tetrahydrofuran. THF is added in an amount sufficient to produce a mixture that contains from 2% to 75% toluene and from 25% to 98% THF, more preferably from 25% to 50% toluene and from 50% to 75% THF, and most preferably from 30% to 40% toluene and from 60% to 70% THF.

In one embodiment of the invention, the amount of THF is sufficient to produce a solution comprising SAH, toluene and tetrahydrofuran. In this embodiment, preferably the mixture is agitated for a sufficient period of time to allow formation of the solution.

In one embodiment of this invention, lithium chloride is added as a mixture with THF; preferably, the percentage of lithium chloride in the lithium chloride-THF mixture is from 1% to 50%, more preferably from 2% to 35%, and most preferably from 3% to 6%. The lithium chloride-THF mixture is added to the mixture comprising SAH, toluene and THF, and the resulting mixture comprising SAH, toluene, THF and lithium chloride is allowed to react to form the product mixture. It is preferred that the lithium chloride-THF mixture is substantially free of any solvent other than THF, and that the SAH mixture is substantially free of any solvent other than THF and toluene. In a preferred embodiment of this invention, the lithium chloride-THF mixture is a solution.

In another embodiment of the invention no THF is added with the lithium chloride, i.e., the lithium chloride is added as a solid to the mixture comprising SAH, toluene and THF.

The molar ratio of SAH to lithium chloride prior to reaction preferably is from 1:10 to 10:1, more preferably from 1:5 to 1:0.75, and most preferably from 1:1.1 to 1:0.95. Preferably, the mixture is allowed to react to form the product mixture by heating to a temperature from 22° C. to 125° C., more preferably from 50° C. to 80° C., and most preferably from 60° C. to 70° C.

In a preferred embodiment of the invention, the product mixture contains lithium aluminum hydride, THF, toluene and sodium chloride. Preferably, the product mixture is filtered to remove sodium chloride. When the SAH mixture and the lithium chloride are substantially free of solvents other than THF and toluene, the resulting product solution is a solution of lithium aluminum hydride in THF/toluene. Optionally, THF is removed from the solution to produce a solution having a higher concentration of lithium aluminum hydride. Typically, removal of THF is accomplished by distillation.

EXAMPLES

Example 1

Pre-Charge of All Reagents

A 500 mL four-neck reaction flask was charged with 5 g (0.093 mol) SAH (91% purity) in a 35% slurry with toluene, 3.84 g lithium chloride (0.093 mol) and 150 mL of THF. The addition was slightly exothermic, increasing the temperature by 3° C. The solution was stirred at 766 rpm under reflux conditions for 6 hours. The resulting slurry was cooled to room temperature and vacuum filtered through a one-inch pad of celite on a glass frit funnel. The filter cake was washed with two portions of fresh THF. The solution (251.74 g) was then collected and analyzed by hydrogen evolution, giving a yield of 80.5%.

Example 2

Addition of a Lithium Chloride Solution

A solution of lithium chloride in THF was prepared by adding 46.70 g lithium chloride to 953.3 g of THF and stirring approximately 30 minutes until the lithium chloride was completely dissolved. A 1000 mL four-neck flask was charged with 25 g (0.4630 mol) of SAH (91% purity) as a 35% slurry in toluene and 181 mL THF. To this mixture was added 400 mL of the solution of lithium chloride in THF (19.10 g LiCl, 0.4630 mol). The addition was slightly exothermic, with the temperature rising approximately 3° C. The resulting mixture was stirred at 699 rpm at 60° C. for six hours. The mixture was cooled to room temperature and vacuum filtered through a one-inch pad of Celite on a glass frit funnel. The filter cake was washed with two portions of fresh THF. The solution (559.68 g) was collected and analyzed by hydrogen evolution to give a yield of 86.24% (13.7 g LAH).

Example 3

Solutions of SAH and Lithium Chloride

A solution of lithium chloride was prepared as described in Example 2. A 500 mL flask was charged with SAH (20 g, 91% purity) as a 35% slurry in toluene and THF (211 mL). The contents of the flask were heated to reflux and stirred for six hours. The resulting solution was filtered. A 1000 mL four-neck flask was fitted with a co-feed adapter to allow simultaneous addition of two solutions. The lithium chloride solution (278.9 mL of prepared solution, 13.026 g LiCl) and the SAH solution were added simultaneously and the contents heated to reflux and mixed at 699 rpm at 60° C. for three hours. The mixture was cooled to room temperature and vacuum filtered through a one-inch pad of Celite on a glass frit funnel. The filter cake was washed with two portions of fresh THF. The solution (652.65 g) was collected and analyzed by hydrogen evolution to give a yield of 96.98% (11.55 g LAH).

Example 4

Solution of SAH and Solid Lithium Chloride

A 500 mL flask was charged with SAH (20 g, 91% purity) as a 35% toluene slurry and THF (105.46 mL). The contents were heated to reflux and stirred for six hours. The solution was filtered. Its hydrogen evolution was measured, showing that the solution contained 12.4 g of SAH in 45.14 mL toluene and 105.46 mL THF. Lithium chloride (9.52 g) was added to the flask, and the contents were stirred for six hours at 60° C. The mixture was cooled to room temperature and vacuum filtered through a one-inch pad of Celite on a glass frit funnel. The filter cake was washed with two portions of fresh THF. The solution (364.03 g) was collected and analyzed by hydrogen evolution to give a yield of 99.03% (8.63 g LAH).

The amounts of reagents and solvents, and the results for several experiments are shown in the Tables. The amounts of SAH and toluene in the SAH slurry are listed, followed by the amount of THF added to the slurry, the amount of LiCl added, with the amount of THF, if any, added with the LiCl, the reaction temperature ("reac. temp"), the % yield, and the hydrogen evolution measurement results from the lithium aluminum hydride product, expressed as g LAH/100 g solution ("conc.").

TABLE 1

Pre-Charge of All Reagents

| SAH g | toluene, g/mL | THF mL | LiCl g | reaction temp. | reaction time | yield, % | conc. |
|---|---|---|---|---|---|---|---|
| 5.0 | 6.11/7.01 | 30 | 3.84 | RT | 8 h | 48.6 | 0.91 |
| 5.0 | 6.11/7.01 | 15 | 3.84 | RT | 8 h | 46.24 | 0.71 |
| 5.0 | 6.11/7.01 | 15 | 3.84 | 68 | 6 h | 11.0 | 0.28 |
| 5.0 | 6.11/7.01 | 30 | 3.84 | 68 | 6 h | 56.51 | 1.64 |
| 5.0 | 6.11/7.01 | 60 | 3.84 | 68 | 6 h | 31.9 | 0.42 |
| 5.0 | 6.11/7.01 | 90 | 3.84 | 68 | 6 h | 62.1 | 0.63 |
| 5.0 | 6.11/7.01 | 150 | 3.84 | 68 | 6 h | 80.5 | 1.02 |

TABLE 2

Addition of a Lithium Chloride Solution

| SAH g | toluene, mL | THF mL | LiCl/THF g/mL | reaction temp[1] | yield, % | conc. |
|---|---|---|---|---|---|---|
| 5.0 | 7.01 | 0 | 3.83/151 | 68 | 69.6 | 0.91 |
| 5.0 | 7.01 | 151.5 | 3.83/151 | 68 | 72 | 0.64 |
| 5.0 | 7.01 | 303 | 3.83/151 | 68 | 73 | 0.86 |
| 25 | 35 | 100 | 19.1/254 | 50 | 80.86 | 8.8 |
| 26.5 | 56.49 | 0 | 19.1/254 | 60 | 75 | 2.5 |
| 26.5 | 113 | 0 | 19.1/254 | 60 | 78.45 | 3.2 |
| 25 | 56.49 | 0 | 19.1/400 | 60 | 82.24 | 2.35 |
| 25 | 113 | 0 | 19.1/400 | 60 | 82.93 | 2.61 |
| 25 | 226 | 0 | 19.1/400 | 60 | 86.12 | 2.34 |
| 25 | 400 | 0 | 19.1/400 | 60 | 82.5 | 1.66 |

[1]All reaction times were 6 hours.

TABLE 3

Solutions of SAH and LiCl

| SAH g | toluene g | THF mL | LiCl[1] | reaction temp[2] | yield, % | conc. |
|---|---|---|---|---|---|---|
| 15.31 | 45.14 | 83.45 | 251.76 | 60 | 83.13 | 1.43 |
| 15.29 | 45.14 | 83.45 | 251.76 | 60 | 83.61 | 1.93 |
| 13.47 | 45.14 | 211 | 221 | 60 | 77.61 | 1.88 |
| 16.96 | 45.14 | 211 | 278.9 | 60 | 96.98 | 1.77 |

[1]Amount in mL of 4.67% LiCl/THF solution.
[2]All reaction times were 3 hours.

TABLE 4

Solution of SAH and Solid Lithium Chloride

| SAH g | toluene g | THF mL | LiCl[1] | reaction temp[2] | yield, % | conc. |
|---|---|---|---|---|---|---|
| 12.4 | 45.14 | 105.45 | 9.52 | 60 | 99.03 | 2.44 |

[1]Amount of solid LiCl in g.
[2]Reaction time was six hours.

What is claimed is:

1. A method for preparing a lithium aluminum hydride solution comprising lithium aluminum hydride, toluene and tetrahydrofuran; said method comprising:
   (a) combining (i) a solution of lithium chloride in tetrahydrofuran and (ii) a mixture comprising sodium aluminum hydride, toluene and from 25% to 98% tetrahydrofuran; and (b) allowing the mixture formed in step (a) to react to form a product mixture comprising lithium aluminum hydride, sodium chloride, tetrahydrofuran and toluene.

2. The method of claim 1, further comprising filtering the product mixture to remove precipitated sodium chloride.

3. The method of claim 2 in which the sodium aluminum hydride and the toluene are added as a slurry containing from 1% to 75% sodium aluminum hydride and from 25% to 99% toluene.

4. The method of claim 3 in which step (b) is performed at a temperature from 22° C. to 125° C. to form the product mixture.

5. The method of claim 4 in which the mixture comprising sodium aluminum hydride, toluene and from 25% to 98% tetrahydrofuran contains sufficient tetrahydrofuran to form a solution comprising sodium aluminum hydride, toluene and tetrahydrofuran.

6. The method of claim 5 in which the solution of lithium chloride in tetrahydrofuran and the solution comprising sodium aluminum hydride, toluene and tetrahydrofuran are substantially free of solvents other than tetrahydrofuran and toluene.

* * * * *